W. S. BURGESS.
Air-Pump.
No. 200,026. Patented Feb. 5, 1878.
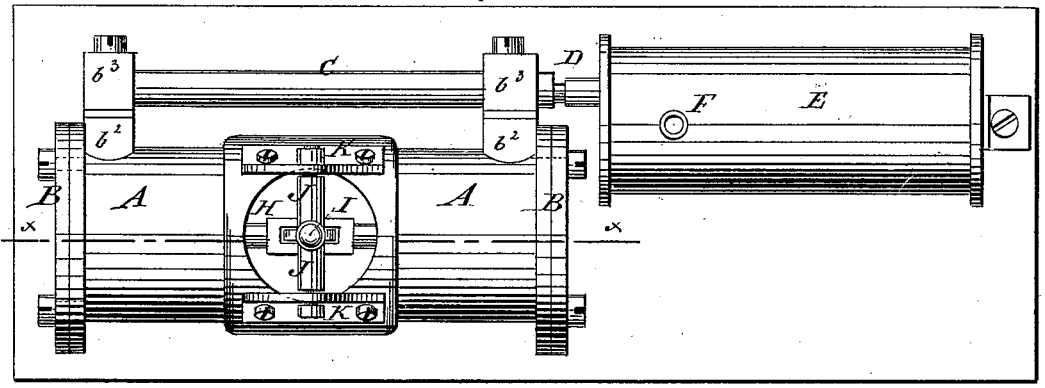
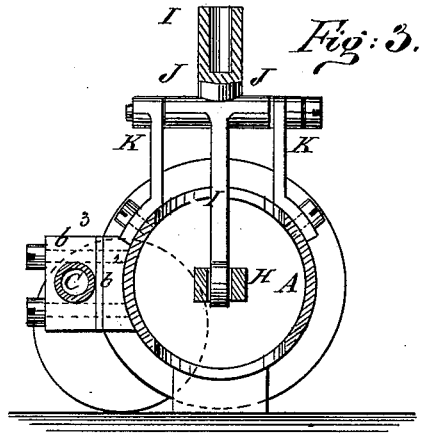
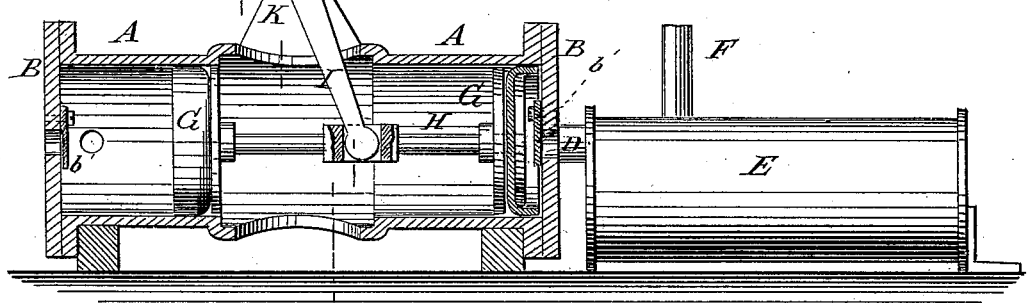
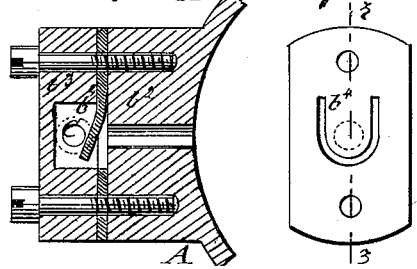
WITNESSES:
Chas. Nida
C. Sedgwick
INVENTOR:
W. S. Burgess
BY
ATTORNEYS.

UNITED STATES PATENT OFFICE.

WARREN S. BURGESS, OF NORRISTOWN, PENNSYLVANIA, ASSIGNOR TO JOHN H. DAGER AND GEORGE W. GRADY, OF SAME PLACE.

IMPROVEMENT IN AIR-PUMPS.

Specification forming part of Letters Patent No. 200,026, dated February 5, 1878; application filed December 26, 1877.

*To all whom it may concern:*

Be it known that I, WARREN S. BURGESS, of Norristown, in the county of Montgomery and State of Pennsylvania, have invented a new and useful Improvement in Air-Pumps, of which the following is a specification:

Referring to the accompanying drawings, forming part of this specification, Figure 1 is a top view of my improved pump. Fig. 2 is a longitudinal section of the same taken through the line $x\, x$, Fig. 1. Fig. 3 is a cross-section of the same, taken through the line $y\, y$, Fig. 2. Fig. 4 is a detail view of the inner side of one of the cylinder-heads. Fig. 5 is a detail view of one of the outlet-valves. Fig. 6 is a detail section of one of the outlet-ports, taken through the line $z\, z$, Fig. 5.

Similar letters of reference indicate corresponding parts.

The object of this invention is to furnish an improved air-pump, designed especially for driving a horse-clipping machine, but which may be used for various other purposes, and which shall be simple in construction, easily worked, and but very little subject to wear.

The invention consists in an improved air-pump, formed by the combination of the cylinder, provided with the inlet-valves in its heads and the outlet-valves in its side, the pipes, the air-reservoir, the two pistons, the single piston-rod, provided with a short slot in its center, and the lever, provided with a circular head upon its lower end, and the cross-head by which it is pivoted to the brackets attached to the said cylinder, as hereinafter fully described.

In the drawings, A represents a cylinder, the ends of which are flanged to receive the bolts for securing its head B to it. In the center of each head B is formed a hole, closed with a valve, $b^1$, opening inward.

In the side of the cylinder A, near each head B, is formed a hole leading out through a block, $b^2$, formed upon the said side of the cylinder A, and to which is bolted a block, $b^3$. Between the blocks $b^2$ $b^3$ is placed a leather plate, which serves as a packing for the joint, and in the center of which is formed a valve, $b^4$, opening outward.

The two blocks $b^3$ are connected by a pipe, C, and from one of the said blocks $b^3$ a pipe, D, leads to an air-reservoir, E, from which a pipe, F, leads to the place or machine where the air is to be used.

In the end parts of the cylinder A are placed two pistons, G, which are packed with leather, and which are attached to the opposite ends of a piston-rod, H.

In the upper and lower middle parts of the cylinder A are formed large openings, through the upper one of which the lever I passes. Upon the lower end of the lever I is formed a circular head, which fits and works in a short slot in the enlarged middle part of the piston-rod H.

Upon the lever I is formed a cross-head, J, the ends of which are pivoted to brackets K, attached to the cylinder A. The upper part of the lever I may be made detachable, if desired.

By this construction, by operating the lever I, the air will enter the cylinder A through the valves $b^1$ alternately, will be forced out through the valves $b^4$, and will pass through the pipes C D into the reservoir E.

With this construction the only points subject to wear will be the pivots of the cross-head J and the head of the lever I, so that the pump will work very easily, and will be very durable.

Having thus described my invention, I claim as new and desire to secure by Letters Patent—

An improved air-pump, formed by the combination of the cylinder A, provided with the inlet-valves $b^1$ in its head, and the blocks $b^2$ $b^3$ and outlet-valves $b^4$ in its side, the pipes C D, the air-reservoir E, the two pistons G, the single piston-rod H, provided with a short slot in its center, and the lever I, provided with the circular head upon its lower end, and the cross-head J, by which it is pivoted to the brackets K, attached to the said cylinder A, substantially as herein shown and described.

WARREN S. BURGESS.

Witnesses:
JOHN H. DAGER,
GEORGE W. GRADY.